United States Patent
Popuri et al.

(10) Patent No.: US 10,168,903 B2
(45) Date of Patent: Jan. 1, 2019

(54) METHODS FOR DYNAMICALLY MANAGING ACCESS TO LOGICAL UNIT NUMBERS IN A DISTRIBUTED STORAGE AREA NETWORK ENVIRONMENT AND DEVICES THEREOF

(71) Applicant: NetApp, Inc., Sunnyvale, CA (US)

(72) Inventors: Sriram Popuri, Bangalore (IN); Sahir Maredia, Maharashtra (IN); Gargi Srinivas, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 154 days.

(21) Appl. No.: 15/358,582

(22) Filed: Nov. 22, 2016

(65) Prior Publication Data

US 2018/0143763 A1    May 24, 2018

(51) Int. Cl.
| | |
|---|---|
| *G06F 11/00* | (2006.01) |
| *G06F 3/06* | (2006.01) |
| *G06F 11/20* | (2006.01) |
| *G06F 11/14* | (2006.01) |
| *H04L 29/08* | (2006.01) |

(52) U.S. Cl.
CPC ............ *G06F 3/0604* (2013.01); *G06F 3/067* (2013.01); *G06F 3/0617* (2013.01); *G06F 3/0635* (2013.01); *G06F 11/1425* (2013.01); *G06F 11/20* (2013.01); *G06F 11/2094* (2013.01); *G06F 2201/805* (2013.01); *G06F 2201/815* (2013.01); *G06F 2201/85* (2013.01); *G06F 2201/875* (2013.01); *H04L 67/1097* (2013.01)

(58) Field of Classification Search
CPC ...... G06F 3/0604; G06F 3/0635; G06F 3/067; G06F 11/2094
See application file for complete search history.

(56) References Cited

U.S. PATENT DOCUMENTS

| | | | | |
|---|---|---|---|---|
| 7,778,157 B1 * | 8/2010 | Tawri | ................ | G06F 11/2005 370/216 |
| 7,831,782 B1 * | 11/2010 | Coulter | ............... | G06F 11/1471 711/159 |

(Continued)

FOREIGN PATENT DOCUMENTS

CA    2719673 A1    1/2011

OTHER PUBLICATIONS

International Search Report and Written Opinion for corresponding PCT Application No. PCT/US2017/048131, dated Nov. 24, 2017, 11 pages.

*Primary Examiner* — Joshua P Lottich
(74) *Attorney, Agent, or Firm* — LeClairRyan PLLC

(57) ABSTRACT

Methods, non-transitory computer readable media, and devices that dynamically adjust a logical unit number fault domain in a distributed storage area network environment includes determining when at least one of a plurality of nodes of a cluster is cut off from others of the plurality of nodes of the cluster. Any logical unit numbers (LUNs) owned by each of the plurality of nodes are identified. A fault domain for any of the identified LUNs owned by the at least one of the plurality of nodes determined to be cut off is adjusted from a distributed task set mode (DTM) of operation to a single task set mode (STM) of operation. This adjustment is made without any communication from the DTM operation to the STM operation to any of one or more host computing devices interacting with the cluster.

15 Claims, 7 Drawing Sheets

(56) References Cited

U.S. PATENT DOCUMENTS

| | | | | |
|---|---|---|---|---|
| 8,464,095 B1* | 6/2013 | Bonwick | ............. | G06F 11/1088 |
| | | | | 714/6.2 |
| 8,930,746 B1* | 1/2015 | Chen | ................... | G06F 11/0793 |
| | | | | 714/6.13 |
| 9,152,336 B1* | 10/2015 | Chen | ...................... | G06F 3/0644 |
| 9,335,949 B1* | 5/2016 | Palekar | ................. | G06F 3/0652 |
| 9,647,933 B1* | 5/2017 | Tawri | ...................... | H04L 45/28 |
| 9,690,803 B1* | 6/2017 | Bono | ................ | G06F 17/30182 |
| 9,817,721 B1* | 11/2017 | Youngworth | ........ | G06F 11/1412 |
| 2002/0095470 A1* | 7/2002 | Cochran | ............. | G06F 11/2046 |
| | | | | 709/208 |
| 2011/0145818 A1* | 6/2011 | Vemuri | ................. | G06F 3/0604 |
| | | | | 718/1 |
| 2011/0252270 A1* | 10/2011 | Abraham | ............ | G06F 11/1425 |
| | | | | 714/4.1 |
| 2013/0080559 A1* | 3/2013 | Rao | ..................... | H04L 67/1097 |
| | | | | 709/208 |
| 2013/0268495 A1 | 10/2013 | Thiel et al. | | |
| 2014/0101279 A1* | 4/2014 | Naganni | ............. | H04L 67/1097 |
| | | | | 709/213 |
| 2015/0169647 A1 | 6/2015 | Kalman et al. | | |

\* cited by examiner

METHODS FOR DYNAMICALLY MANAGING ACCESS TO LOGICAL UNIT NUMBERS IN A DISTRIBUTED STORAGE AREA NETWORK ENVIRONMENT AND DEVICES THEREOF

FIELD

This technology generally relates to methods and devices that manage distributed storage area network (SAN) environment and, more particularly, to methods, non-transitory computer readable media, and devices that dynamically manages access to logical unit numbers in a distributed storage area network that is transparent and non-disruptive to hosts.

BACKGROUND

A distributed storage area network (SAN) environment has multiple nodes that form a cluster. This cluster presents a single logical view of storage to a host, but actually comprises a plurality of logical unit numbers (LUNs). As a result, access to a particular one of the plurality of LUNs owned by one of the multiple nodes is transparent to the host. However, internally the each of the LUNs are physically connected to and owned by only one of the multiple nodes in the cluster. As a result, any media access operation to one of these LUNs has to be redirected to the node in the cluster that owns the LUN. Accordingly, to facilitate this redirect, certain metadata information about each of the LUNs, such as the administrative state and the reservations state, is distributed and cached on each of the multiple nodes in the cluster that can reach the LUNs. It is essential that there is a single and consistent view of the distributed metadata information across all the nodes in the cluster and any changes that happen to the distributed metadata information needs to be updated on all the participating nodes in the cluster.

Cluster connectivity problems in this distributed SAN environment can cause nodes that have lost connectivity with the rest of the cluster to become unresponsive. For example, there could be network issues between the nodes of a cluster resulting in a partition. A partition is a condition that occurs in a cluster when only a subset of the nodes can communicate with each other. Nodes within a partition can maintain connectivity between each other, however they will be unreachable from nodes of a different partition. This partition in the distributed SAN environment is also known as a split brain scenario. Unfortunately, prior methods and systems have not been able to dynamically manage access to LUNs in a way that is transparent and non-disruptive to hosts accessing the LUNs.

DETAILED DESCRIPTION

Figure 1:
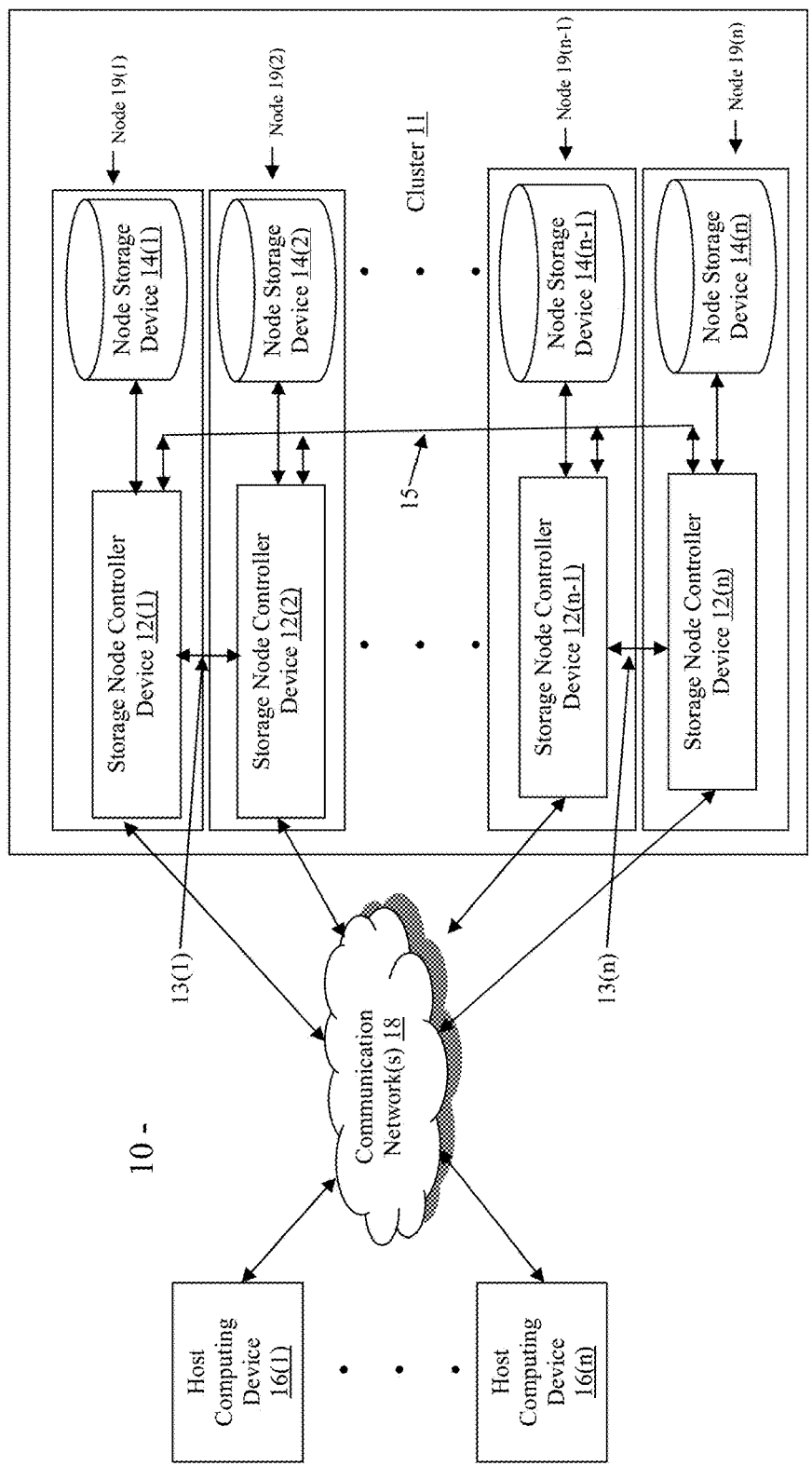
FIG. 1 is a block diagram of an example of a storage area network (SAN) environment with a cluster comprising a plurality of nodes configured to dynamically manage access to logical unit numbers in the SAN environment that is transparent and non-disruptive to any of the host computing devices.
Figure 2:
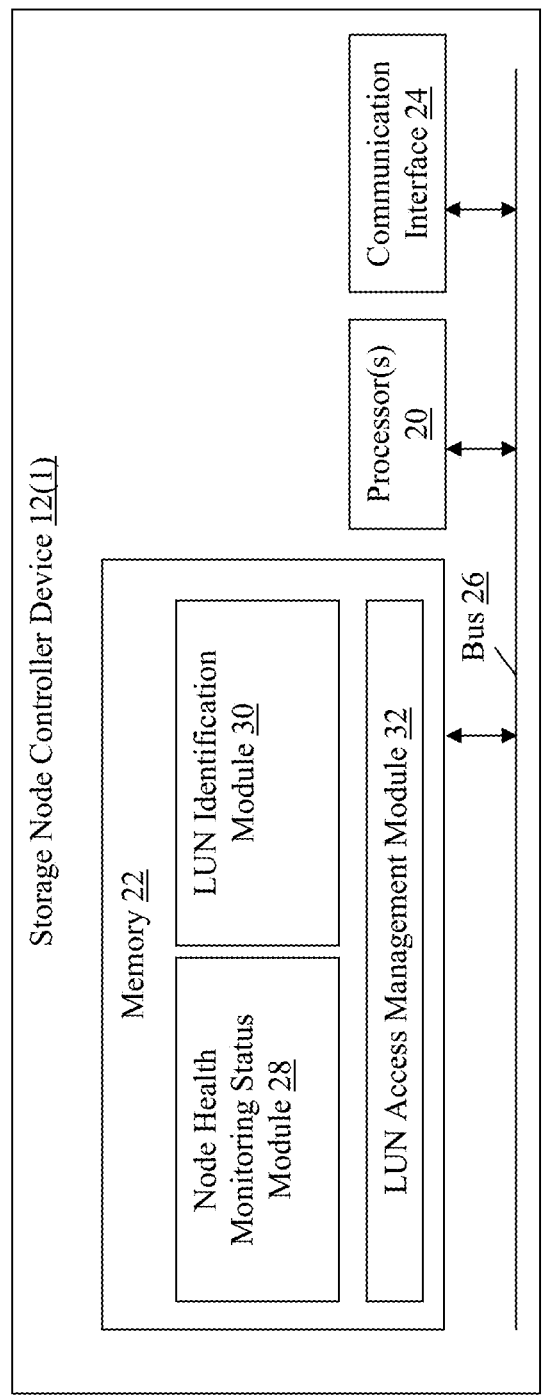
FIG. 2 is a block diagram of an example of a storage node controller devices for one of the a plurality of nodes shown in FIG. 1.

An example of a storage area network (SAN) environment 10 with a cluster 11 comprising a plurality of nodes 19(1)-19(n) configured to dynamically manage access to logical unit numbers (LUNs) in a manner that is transparent and non-disruptive to host computing devices 16(1)-16(n) is illustrated in FIGS. 1-2. In this particular example, the environment 10 includes the cluster 11 with storage node controller devices 12(1)-12(n) and node storage devices 14(1)-14(n) that comprise the nodes 19(1)-19(n), and the host computing devices 16(1)-16(n) which are coupled together by one or more communication networks 18, although the environment may comprise other types and/or numbers of systems, devices, components, and/or other elements in other configurations. This technology provides a number of advantages including providing methods, non-transitory computer readable media, and computing devices that dynamically manage access to logical unit numbers in a SAN environment that is transparent and non-disruptive to host computing devices.

Referring more specifically to FIGS. 1-2, in this example the cluster 11 comprises the plurality of nodes 19(1)-19(n) and presents a single logical view of storage to one or more of the host computing devices 16(1)-16(n), although the cluster can comprise other types and/or numbers of systems, devices, components, and/or other elements in other configurations.

Each of the plurality of nodes 19(1)-19(n) comprises one of the storage node controller devices 12(1)-12(n) and a corresponding one of the node storage devices 14(1)-14(n), although each of the nodes could comprise other types and/or numbers of systems, devices, components, and/or other elements in other configurations. In this particular example, storage node controller devices 12(1)-12(2) are coupled together by a high availability interconnect 13(1) and storage node controller devices 12(n-1)-12(n) are coupled together by a high availability interconnect 13(2), although one or more of the storage node controller devices 12(1)-12(n) may or may not have other types and/or numbers of interconnections. Additionally, in this example storage node controller devices 12(1)-12(n) are also each coupled together by a backend cluster interconnect 15, although other types and/or numbers of connections may or may not be used between two or more of these devices.

Referring more specifically, to FIG. 2, an example of one storage node controller computing device 12(1) is illustrated. In this example, each of the other storage node controller computing device 12(2)-12(n) have the same in structure and operation as the storage node controller computing device 12(1), except as otherwise illustrated and described by way of the examples herein. Each of the storage node controller computing devices 12(1)-12(n)

could comprise other types and/or numbers of systems, devices, components, and/or other elements in other configurations. Each of the storage node controller computing devices 12(1)-12(n) may perform any number of functions including by way of example managing storage operations on the node storage devices 14(1)-14(n), such as managing access to LUNs. The storage node controller computing device 12(1) includes one or more processors 20, a memory 22, and/or a communication interface 24, which are coupled together by a bus 26 or other communication link, although again each of the storage node controller computing devices 12(1)-12(n) or other computing devices can include other types and/or numbers of systems, devices, components, and/or other elements in other configurations.

The processor(s) 20 of the storage node controller computing device 12(1) may execute programmed instructions stored in the memory 22 of the storage node controller computing device 12(1) for the operations and/or other functions illustrated and described by way of the examples herein. The processor(s) 20 of the storage node controller computing device 12(1) may include one or more CPUs or general purpose processors with one or more processing cores, for example, although other types of processor(s) can also be used.

The memory 22 of the storage node controller computing device 12(1) stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

Accordingly, the memory 22 of the storage node controller computing device 12(1) can store one or more applications that can include computer executable instructions that, when executed by the storage node controller computing device 12(1), cause the storage node controller computing device 12(1) to perform actions, such as storage operations including dynamically managing access to LUNs in the cluster 11, for example, and to perform other actions and operations as described and illustrated below with reference to FIGS. 3-7. The application(s) also can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the storage node controller computing device 12(1) itself, may be located in virtual server(s) running in a cloud-based computing environment rather than being tied to one or more specific physical network computing devices. Also, the application(s) may be running in one or more virtual machines (VMs) executing on the storage node controller computing device. Additionally, in one or more embodiments of this technology, virtual machine(s) running on the storage node controller computing device 12(1) may be managed or supervised by a hypervisor.

In this particular example, the memory 22 of the storage node controller computing device 12(1) includes a node health monitoring status module 28, a LUN identification module 30, and a LUN access management module 32 which each comprise stored programmed instructions to execute aspects of this technology as illustrated and described herein, although the memory can for example include other types and/or numbers of other policies, modules, programmed instructions, databases, and/or applications. The node health monitoring status module 28 comprises stored programmed instructions to monitor the status of the connections to the storage node controller computing device 12(1)-12(n), although this module could perform other types and/or numbers of other monitoring operations in other manners. The LUN identification module 30 comprises stored programmed instructions to identify the particular LUNs owned by each of the node storage devices 14(1)-14(n), although this module could perform other types and/or numbers of other identification operations in other manners. The LUN access management module 32 comprises stored programmed instructions to dynamically manage operations relating to information about and/or access to the LUNs in the node storage devices 14(1)-14(n), although this module could perform other types and/or numbers of other monitoring operations in other manners.

The communication interface 24 of the storage node controller computing device 12(1) operatively couples and communicates between the storage node controller computing device 12(1) and the other storage node controller devices 12(2)-12(n), one or more of the node storage devices 14(1)-14(n), and/or one or more of the host computing devices 16(1)-16(n), which are all coupled together by one or more communication network(s) 18 and/or other connections, although other types and/or numbers of communication networks and/or other connections with other types and/or numbers of connections and/or configurations to other devices and/or elements can also be used.

By way of example only, the communication network(s) 18 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 18 can also include direct connection(s) (e.g., for when a device illustrated in FIG. 1, such as the storage node controller computing devices 12(1)-12(n), the node storage devices 14(1)-14(n), and/or the host computing devices 16(1)-16(n), operate as virtual instances on the same physical machine).

While the storage node controller computing device 12(1) is illustrated in this example as including a single device, the storage node controller computing device 12(1) in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the storage node controller computing device.

Additionally, one or more of the devices that together comprise the storage node controller computing device 12(1) in other examples can be standalone devices or integrated with one or more other devices or apparatuses, such as one of the node storage devices 14(1)-14(n), for example. Moreover, one or more of the devices of the storage node controller computing device 12(1) in these examples can be in a same or a different communication network including one or more public, private, or cloud networks, for example.

Each of the node storage devices 14(1)-14(n) may include one or more processors, a memory, and a communication interface, which are coupled together by a bus or other communication link, although other numbers and/or types of storage devices could be used. The node storage devices 14(1)-14(n) in this example may process storage operation requests received from the host computing devices 16(1)-16(n) via one or more of the storage node controller computing devices 12(1)-12(n) over communication network(s) 18 and/or other connections. The node storage devices 14(1)-14(n) may be hardware or software or may represent a system with multiple servers in a pool, which may include internal or external networks. Although the node storage devices 14(1)-14(n) are illustrated as single devices, one or more may comprise two or more systems, devices, components, and/or other elements in other configurations.

Thus, the technology disclosed herein is not to be construed as being limited to a single environment and other configurations and architectures are also envisaged. For example, one or more of the node storage devices 14(1)-14(n) can operate within or as part of a corresponding one of the storage node controller computing devices 12(1)-12(n) rather than as a stand-alone storage device communicating with the corresponding one of the storage node controller computing devices 12(1)-12(n).

The host computing devices 16(1)-16(n) in this example include any type of computing device, such as mobile computing devices, desktop computing devices, laptop computing devices, tablet computing devices, virtual machines (including cloud-based computers), or the like, that can perform operations and other functions, such as storage operations on one or more of the nodes 19(1)-19(n). Each of the host computing devices 16(1)-16(n) in this example includes a processor, a memory, and a communication interface, which are coupled together by a bus or other communication link, although other numbers and/or types of network devices could be used.

The host computing devices 16(1)-16(n) may run interface applications, such as standard Web browsers or stand-alone client applications, which may provide an interface to make requests for, and receive content stored on, one or more of the node storage devices 14(1)-14(n) via the communication network(s) 18 and/or other connections. The host computing devices 16(1)-16(n) may further include a display device, such as a display screen or touchscreen, and/or an input device, such as a keyboard for example.

Although the exemplary environment 10 with nodes 19(1)-19(n) comprising the storage node controller computing devices 12(1)-12(n) and node storage devices 14(1)-14(n), the host computing devices 16(1)-16(n), and the communication network(s) 18 and other connections are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the environment 10, such as storage node controller computing devices 12(1)-12(n), node storage devices 14(1)-14(n), and/or host computing devices 16(1)-16(n) for example, may be configured to operate as virtual instances on the same physical machine. In other words, one or more of the storage node controller computing devices 12(1)-12(n), node storage devices 14(1)-14(n), or host computing devices 16(1)-16(n) may operate on the same physical device rather than as separate devices communicating through communication network(s) 18 and/or other connections. Additionally, there may be more or fewer nodes 19(1)-19(n) having storage node controller computing devices 12(1)-12(n) and node storage devices 14(1)-14(n) and more or fewer host computing devices 16(1)-16(n) than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of dynamically managing access to LUNs in nodes 19(1)-19(n) comprising the storage node controller computing devices 12(1)-12(n) and the node storage devices 14(1)-14(n) in the cluster 11 that is transparent and non-disruptive to host computing devices 16(1)-16(n) will now be described with reference to FIGS. 1-7. For ease of illustration, the functional block diagrams shown in FIGS. 4-6 only illustrate a portion of the environment 10 and cluster 11.

Figure 3:
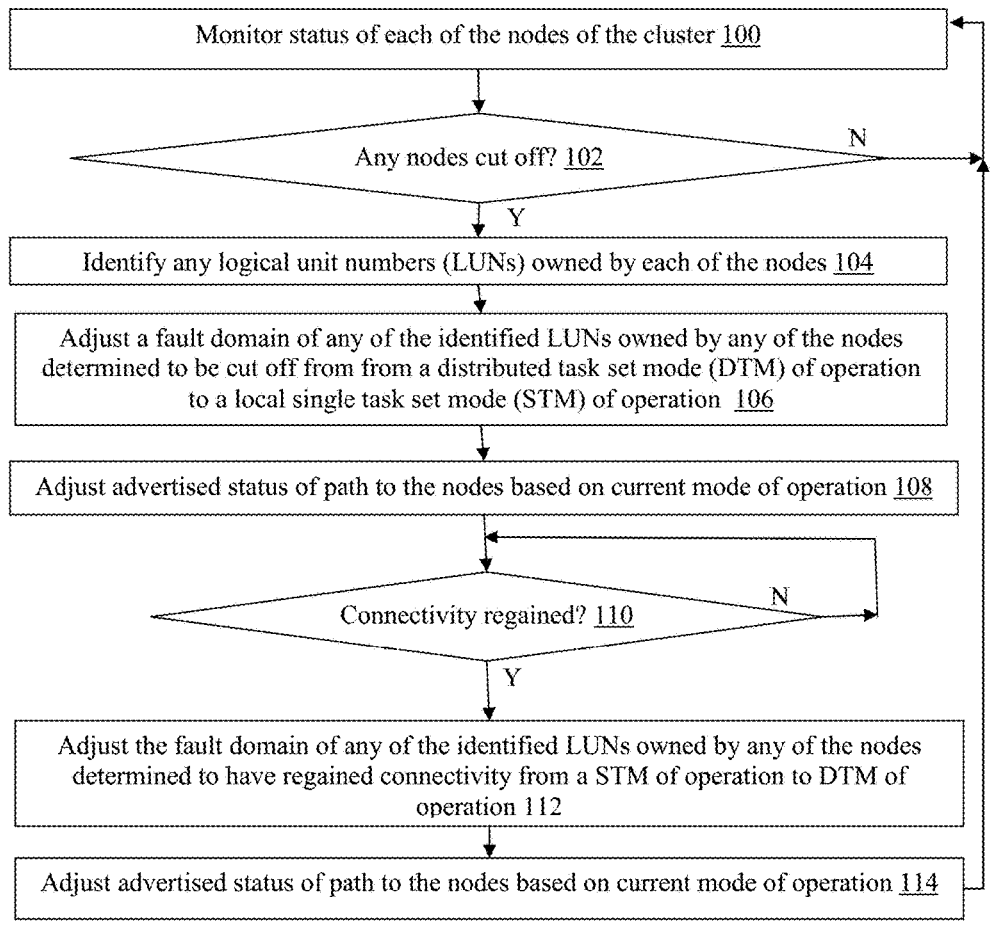
FIG. 3 is a flow chart of an example of a method for dynamically manages access to logical unit numbers in a distributed storage area network that is transparent and non-disruptive to any of the host computing devices.

Referring more specifically to FIG. 3, in step 100, the current connection status of each of the storage node controller devices 12(1)-12(n) is monitored by each of the storage node controller devices 12(1)-12(n). Each of the storage node controller devices 12(1)-12(n) may share and store in memory the monitored status with the other storage node controller devices 12(1)-12(n), such as via the cluster interconnect 15 by way of example only, although other manners and/or protocols for sharing or otherwise making connection status available could be used.

Figure 4:
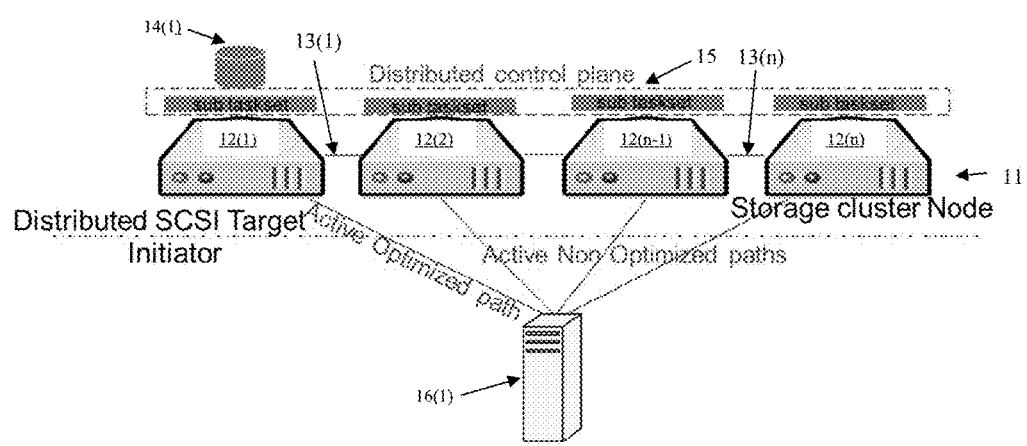
FIG. 4 is a functional block diagram of an example of the cluster before a partitioning.

An example of the cluster 11 before any detected cut-off, such as detection of an unresponsive one of the nodes 19(1)-19(n), is illustrated by the functional block diagram in FIG. 4. In this particular example, there is no current partitioning of the nodes 19(1)-19(n) in the cluster 11 and the host computing device 16(1) can access the node storage device 14(1) by an active optimized (A/O) path to the storage node controller device 12(1) or by one of the active non-optimized (A/NO) paths to one of the storage node controllers 12(2)-12(n) and the cluster interconnect 15.

In step 102, a determination is made by each of the storage node controller devices 12(1)-12(n) based on the monitoring in step 100 if any of the connections for the storage node controller devices 12(1)-12(n) for any of the nodes 19(1)-19(n) have been cut off, such as any of the nodes 19(1)-19(n)

being non-responsive for example. If in step 102, a cut off for any of the storage node controller devices 12(1)-12(n) for any of the nodes 19(1)-19(n) is not detected, then the No branch is taken back to step 100 to continue to monitor the connection status. If in step 102, a cut off for any of the storage node controller devices 12(1)-12(n) for any of the nodes 19(1)-19(n) is detected, then the Yes branch is taken to step 104.

Figure 5:
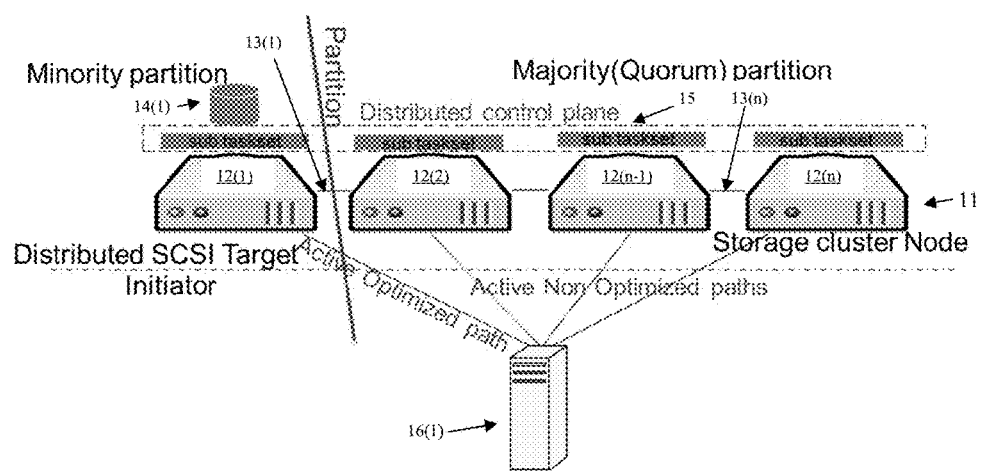
FIG. 5 is a functional block diagram of an example of the cluster after a partition.

An example of the cluster 11 after a detected cut-off, such as detection of node 19(1) being unresponsive, is illustrated by the functional block diagram in FIG. 5. In this particular example, there is a partitioning by the storage node controller devices 12(1)-12(n) of node 19(1) (minority partition) from the nodes 19(2)-19(n) (majority partition or quorum) in the cluster 11. Initially and without the technology illustrated and described herein, the path from the host computing device 16(1) to the node storage device 14(1) via the storage node controller device 12(1) is still advertised as active optimized and the path to the node storage device 14(1) via one of the storage node controller devices 12(2)-12(n) is still advertised as active non-optimized.

In step 104, any logical unit numbers (LUNs) owned by each of the node storage devices 14(1)-14(n) is identified by and may be stored by each of the storage node controller devices 12(1)-12(n). Each of the storage node controller devices 12(1)-12(n) may share any of the identified ownership of the LUNs with the other storage node controller devices 12(1)-12(n), such as via the cluster interconnect 15 by way of example only which can be stored by the storage node controller devices 12(1)-12(n).

In step 106, a fault domain for any of the identified LUNs owned by owned by the one or more node storage devices 14(1)-14(n) accessible by the corresponding one or more of the storage node controller devices 12(1)-12(n) determined to be cut off (i.e. in the minority partition) is adjusted from a distributed task set mode (DTM) of operation to a local single task set mode (STM) of operation without any communication about the adjusting from the DTM operation to the STM operation to any of one or more host computing devices 16(1)-16(n) interacting with the cluster 11. When making this adjustment, any input/output (I/O) operations for any of the identified LUNs owned by the one or more node storage devices 14(1)-14(n) accessible by the corresponding one or more of the storage node controller devices 12(1)-12(n) determined to be cut off (i.e. in the minority partition) are aborted.

In this particular example, DTM is a distributed mode of operation which requires all storage node controller devices 12(1)-12(n) that have a path to any of the identified LUNs owned by the one or more node storage devices 14(1)-14(n) to be perfectly in synchronization with each other while serving data to any of the host computing devices 16(1)-16(n). Additionally, in this particular example STM is a single task mode of operation that eliminates the above synchronization requirement by just operating locally with the particular one of the storage node controller devices 12(1)-12(n).

Additionally in step 106, access to any of the identified LUNs owned by the one or more node storage devices 14(1)-14(n) accessible by the corresponding one or more of the storage node controller devices 12(1)-12(n) not cut off (i.e. in the majority partition of cluster 11) the modes of operation with respect to each other are not adjusted. Any of the identified LUNs owned by the one or more node storage devices 14(1)-14(n) accessible by the corresponding one or more of the storage node controller devices 12(1)-12(n) not cut off (i.e. in the majority partition) remain in a distributed task set mode (DTM) of operation with respect to the majority partition.

In step 108, the advertised status of the path to any of the identified LUNs owned by the one or more node storage devices 14(1)-14(n) accessible by the corresponding one or more of the storage node controller devices 12(1)-12(n) determined to be cut off (i.e. in the minority partition) is set to a designation of active optimized while all other paths via the other storage node controller devices 12(1)-12(n) in the majority partition to any of those identified LUNs in the minority partition is adjusted to a designation of unavailable (U).

Meanwhile, the advertised status of each path directly to any of the identified LUNs owned by the one or more node storage devices 14(1)-14(n) accessible by the corresponding one or more of the storage node controller devices 12(1)-12(n) not cut off (i.e. in the majority partition) are set to a designation of active optimized. The advertised status of other indirect paths, such as via one of the high availability interconnects 13(1)-13(n) or cluster interconnect 15, to any of the identified LUNs owned by the one or more node storage devices 14(1)-14(n) accessible by the corresponding one or more of the storage node controller devices 12(1)-12(n) not cut off (i.e. in the majority partition) are set to designation of active non-optimized.

Figure 6:
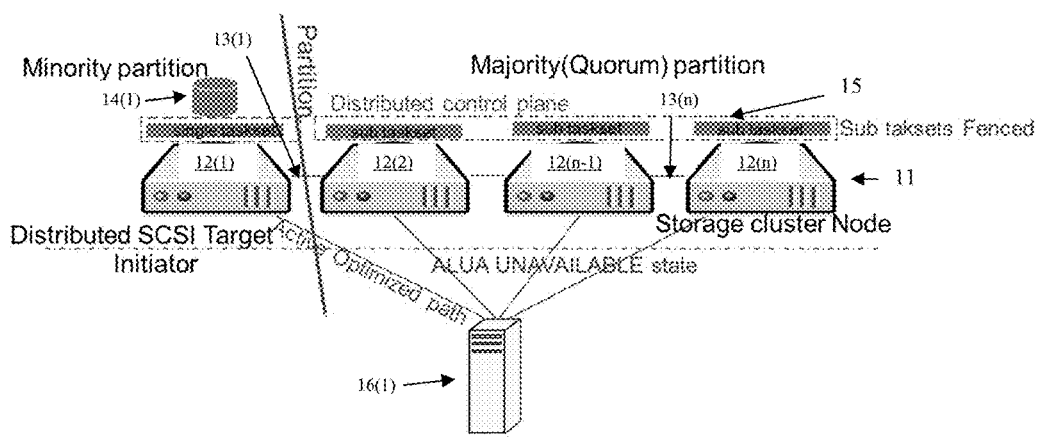
FIG. 6 is a functional block diagram of an example of the cluster after a dynamic adjustment of states of paths to nodes based on the identification of ownership of logical unit numbers.
Figure 7:
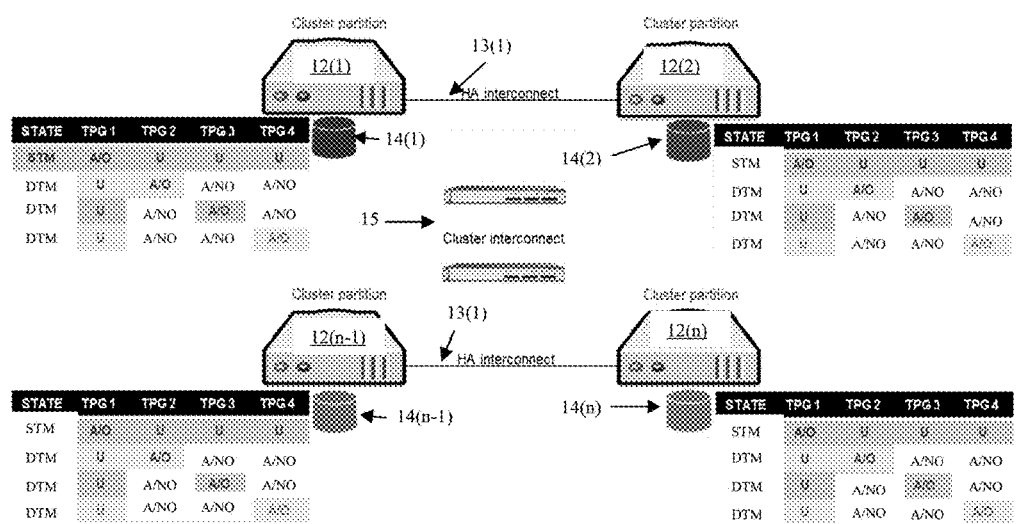
FIG. 7 is an example of a table of states of paths to each of the plurality of nodes after the dynamic adjustment based on the identification of the partition.

An example of adjusting a fault domain of any identified LUNs of a node 19(1) that has been detected as being unresponsive and partitioned from DTM operation to STM operation is illustrated by the functional block diagram in FIG. 6 and exemplary table with adjusted designations for paths in FIG. 7. In this particular example, there is a partitioning by the storage node controller devices 12(1)-12(n) of node 19(1) (minority partition) from the nodes 19(2)-19(n) (majority partition or quorum) in the cluster 11. Additionally, the operation in the minority partition is set to STM and the path from the host computing device 16(1) to any of the identified LUNs owned by the node storage device 14(1) via the storage node controller device 12(1) is still advertised as active optimized. Additionally, the paths to any of the identified LUNs owned by the node storage device 14(1) via one of the storage node controller devices 12(2)-12(n) is now advertised as unavailable. Meanwhile, the operation in the majority partition remains as DTM and the direct path from the host computing device 16(1) to any of the identified LUNs owned by each of the node storage device 14(2)-14(n) via the corresponding one of the storage node controller device 12(2)-12(n) is still advertised as active optimized. Additionally, the indirect paths to any of the identified LUNs owned by the node storage device 14(2)-14(n) via a non-corresponding one of the storage node controller devices 12(2)-12(n) is now advertised as active non-optimized within the majority partition.

In step 110, a determination is made by each of the storage node controller devices 12(1)-12(n) based on monitoring the connection status of each of the storage node controller devices 12(1)-12(n) if the one or more of the storage node controller devices 12(1)-12(n) determined to be cut off has regained connectivity to the other storage node controller devices 12(1)-12(n). If in step 110, the determination indicates connectivity has not been regained, then the No branch is taken back to step 110 to continue monitoring the connection status until connectivity is regained. If in step 112 the determination indicates connectivity has been regained, then the Yes branch is taken back to step 112.

In step 112, an adjustment of the fault domain for any of the identified LUNs owned by owned by the one or more node storage devices 14(1)-14(n) accessible by the corresponding one or more of the storage node controller devices 12(1)-12(n) determined to have regained connectivity or otherwise healed is adjusted from a local STM of operation to a DTM of operation again without any communication about the adjusting from the STM operation to the DTM operation to any of one or more host computing devices 16(1)-16(n) interacting with the cluster 11. Accordingly, with this technology the fault domain can be expanded and shrunk as needed based on the status of connectivity in a manner that is transparent and non-disruptive to the host computing device 16(1)-16(n).

In step 114, when healed and adjusted to DTM, the advertised status of the direct paths to each of the node storage devices 14(1)-14(n) via the corresponding one of the storage node controller devices 12(1)-12(n) is set to active optimized and the status of the indirect paths to each of the node storage devices 14(1)-14(n) via the non-corresponding one of the storage node controller devices 12(1)-12(n) active non-optimized.

Accordingly, as illustrated by way of the examples herein this technology provides methods, non-transitory computer readable media, and computing devices that dynamically manage access to logical unit numbers in a SAN environment. This technology is able to dynamically switch modes of operation based on the identified LUNs in the minority and majority partitions and keeps this switching process transparent and non-disruptive to the host computing devices. Further, with this technology while going through the transitions from DTM to STM and from STM back to DTM, any input/output (I/O) operations on the host computing devices remain undisrupted and seamless.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   determining, by a computing device, when at least one of a plurality of nodes of a cluster is cut off from other ones of the nodes;
   identifying, by the computing device, any logical unit numbers (LUNs) owned by each of the nodes; and
   adjusting, by the computing device, a fault domain for any of the identified LUNs owned by the at least one of the nodes determined to be cut off from a distributed task set mode (DTM) of operation to a single task set mode (STM) of operation without any communication about the adjusting to any host computing device interacting with the cluster.

2. The method as set forth in claim 1 wherein the adjusting the fault domain further comprises:
   aborting, by the computing device, any pending input/output (I/O) operations for any of the identified LUNs owned by the at least one of the nodes determined to be cut off.

3. The method as set forth in claim 1 further comprising, advertising, by the computing device, a path to the at least one of the nodes determined to be cut off as an active optimized path and other paths from the other nodes to the at least one of the nodes determined to be cut off as unavailable.

4. The method as set forth in claim 1 further comprising:
   adjusting the fault domain for any of the identified LUNs owned by the at least one of the nodes determined to regain connectivity by switching from the STM of operation to the DTM of operation without any communication about the adjusting to any host computing device interacting with the cluster.

5. The method as set forth in claim 4 further comprises:
   advertising, by the computing device, paths from the other nodes to the at least one of the nodes as active non-optimized.

6. A non-transitory machine readable medium having stored thereon instructions for performing a method comprising machine executable code which when executed by at least one machine, causes the machine to:
   determine when at least one of a plurality of nodes of a cluster is cut off from other ones of the nodes;
   identify any logical unit numbers (LUNs) owned by each of the nodes; and
   adjust a fault domain for any of the identified LUNs owned by the at least one of the nodes determined to be cut off from a distributed task set mode (DTM) of operation to a single task set mode (STM) of operation without any communication about the adjusting to any host computing device interacting with the cluster.

7. The medium as set forth in claim 6 wherein the executable code for the adjust the fault domain, when executed by the at least one machine, further causes the machine to:
   abort any input/output (I/O) operations for any of the identified LUNs owned by the at least one of the nodes determined to be cut off.

8. The medium as set forth in claim 7 wherein the executable code, when executed by the at least one machine, further causes the machine to:
   adjusting the fault domain for any of the identified LUNs owned by the at least one of the nodes determined to regain connectivity by switching from the STM of operation to the DTM of operation without any communication about the adjusting to any host computing device interacting with the cluster.

9. The medium as set forth in claim 8 wherein the executable code, when executed by the at least one machine, further causes the machine to:
   advertise paths from the other nodes to the at least one of the nodes as active non-optimized.

10. The medium as set forth in claim 6 wherein the executable code, when executed by the at least one machine, further causes the machine to:
    advertise a path to the at least one of the nodes determined to be cut off as an active optimized path and other paths from the other nodes to the at least one of the nodes determined to be cut off as unavailable.

11. A computing device comprising:
    a memory containing machine readable medium comprising machine executable code having stored thereon instructions for dynamically managing access to logical unit numbers (LUNs) in a distributed storage area network environment; and a processor coupled to the memory, the processor configured to execute the machine executable code to cause the processor to:

determine when at least one of a nodes of a cluster is cut off from other ones of the nodes;

identify any logical unit numbers (LUNs) owned by each of the nodes; and adjust a fault domain for any of the identified LUNs owned by the at least one of the nodes determined to be cut off from a distributed task set mode (DTM) of operation to a single task set mode (STM) of operation without any communication about the adjusting to any host computing device interacting with the cluster.

12. The device as set forth in claim 11 wherein for the adjusting the fault domain the one or more processors are further configured to be capable of executing the programmed instructions stored in the memory to:

abort any input/output (I/O) operations for any of the identified LUNs owned by the at least one of the nodes determined to be cut off.

13. The device as set forth in claim 11 wherein the one or more processors are further configured to be capable of executing the programmed instructions stored in the memory to:

advertise a path to the at least one of the nodes determined to be cut off as an active optimized path and other paths from the other ones of the nodes of the cluster to the at least one of the nodes determined to be cut off as unavailable.

14. The device as set forth in claim 11 wherein the one or more processors are further configured to be capable of executing the programmed instructions stored in the memory to:

adjusting the fault domain for any of the identified LUNs owned by the at least one of the nodes determined to regain connectivity by switching from the STM of operation to the DTM of operation without any communication about the adjusting to any host computing device interacting with the cluster.

15. The device as set forth in claim 14 wherein the one or more processors are further configured to be capable of executing the programmed instructions stored in the memory to:

advertise paths from the other ones of the nodes to the at least one of the nodes as active non-optimized.

* * * * *